Sept. 18, 1934.                F. BUCK                  1,973,843
                            MEASURING TAPE
                          Filed Aug. 17, 1931
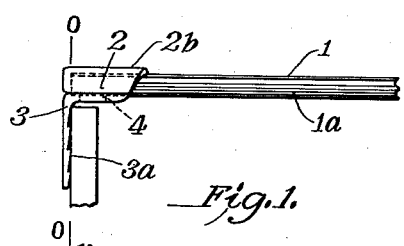
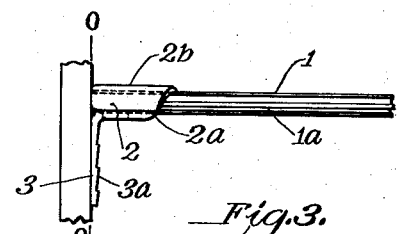
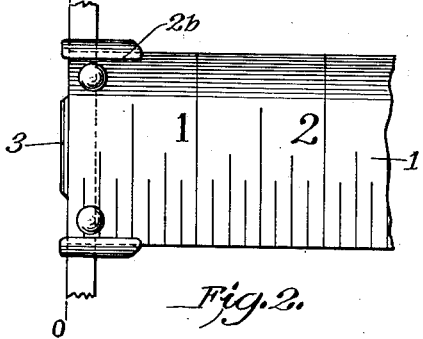
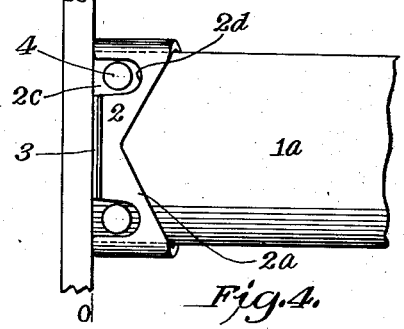
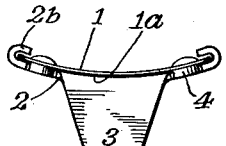
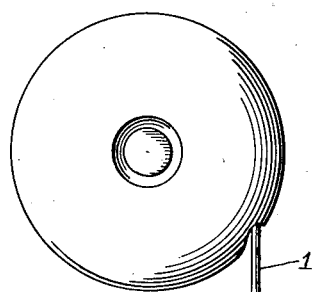
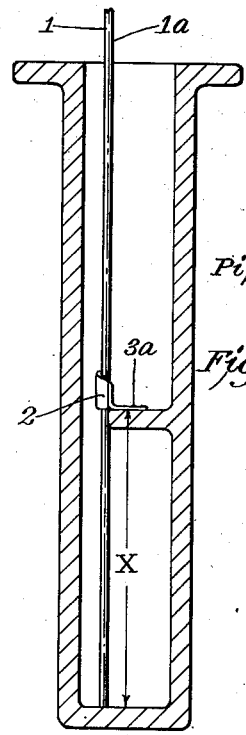
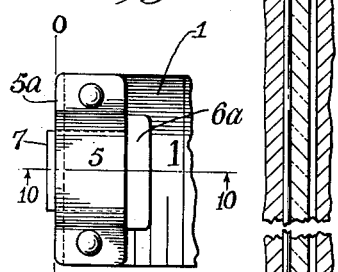
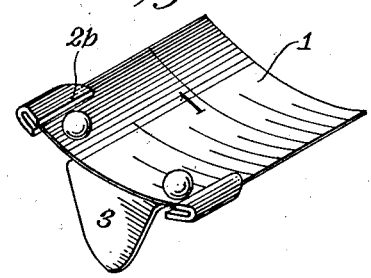
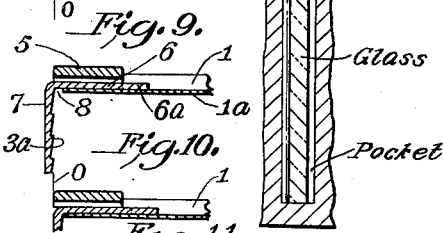
INVENTOR
FRED BUCK
BY George B. Willcop
ATTORNEY Patented Sept. 18, 1934

1,973,843

UNITED STATES PATENT OFFICE 1,973,843

MEASURING TAPE

Fred Buck, Saginaw, Mich., assignor to Lufkin Rule Co., Saginaw, Mich., a corporation of Michigan Application August 17, 1931, Serial No. 557,535

7 Claims. (Cl. 33—137)

This invention relates to hooks for tape measures and pertains particularly to a novel hook structure for use with a metal tape of concavo-convex cross sectional shape.

As is known, such a tape is windable and unwindable on a tape drum in the same way as a flat flexible tape, yet because of its curved cross sectional shape is inflexible enough to remain straight after having been drawn out from the tape case. Such a tape is commonly used in two ways. One known way is to hold it tensioned by means of a tape hook at its end, the same as a flexible tape. The other way is to extend it in a straight line and abut its end against the work piece in the same way that abutment measurements are taken with a straight rule.

An object of the present invention is to provide a hook element that is slidable along the straight extended part of a concavo-convex tape so as to function in the manner of a depth gage and aid in reading measurements. An instance of its use as a depth gage is in measuring the depth of a window pocket in an automobile. The tape, being thin and sufficiently inflexible for the purpose, is inserted in the narrow crack between the glass and the frame of the pocket and then pushed downwardly alongside the glass. During this feeding-in movement of the tape the slidable hook element which is a feature of my invention is stopped by the ledge at the entrance to the pocket and the tape slides through it. The tape having reached the bottom of the pocket is withdrawn. The hook element remains in place on the tape as a gage or index to aid in reading the measurement. Another instance of the use of the invention is to facilitate taking measurements between two ordinarily inaccessible objects, for example measuring the distance from a closed end of a long pipe to a transverse flange within the pipe, the measurement being taken by the operator stationed at the end of the pipe remote from the place being measured.

Another object is to provide certain stop elements on the end of the tape arranged in relation to co-operating stops on the slidable hook, so that the hook when pushed clear to the end of the tape so as to bring up against the stop will present its inner or work-engaging face in the exact transverse plane of the zero end of the tape and give a correct hook measurement, yet when the tape end is abutted against a work piece, the hook automatically pushes back so as to allow the zero end of the tape to abut without introducing any error into the abutment measurement on account of the thickness of the hook proper.

With the foregoing and certain other objects in view, which will appear later in the specification, the invention comprises the devices described and claimed and the equivalents thereof.

In the drawing Fig. 1 is an edge view of my improved hook applied to an end of a concavo-convex tape, the inner work engaging face of the hook being shown in register with the zero end of the tape.

Fig. 2 is a plan view of the same.

Fig. 3 is an edge view of the hook retracted and inoperative, the zero end of the tape abutting against the work piece.

Fig. 4 is a bottom view of the parts shown in Fig. 3.

Fig. 5 is an end view of the hook and tape.

Fig. 6 is a perspective view.

Fig. 7 is a vertical cross-sectional view of an automobile door showing the hook as used for measuring the depth of the glass door.

Fig. 8 is a longitudinal sectional view of a tube, showing the hook as used for measuring the distance between two inaccessible points within the tube.

Fig. 9 is a plan view showing the zero end of a tape measure with a modified form of slidable hook applied to it.

Fig. 10 is a section on line 10—10 of Fig. 9, the hook being in its outwardly extended position, for taking hook measurements.

Fig. 11 is a similar view, partly broken away, showing the hook of Fig. 10 in retracted position for taking abutment measurements.

On concavo-convex tape 1 my improvement provides a slidable rider 2. On the rider 2 is a lateral projection or hook 3. When the tape is extended in a straight line rider 2 can be freely slid along it lengthwise.

The preferred form, shown in Figs. 1-8, is usuable for abutment measurements and tension measurements as well as for sliding depth gage measurements, whereas the modified form, illustrated in Figs. 9, 10, 11, is usable for the first two types of measurements, permitting the hook to shift automatically so the thickness of the hook can not cause even a slight error in measurement, but on account of the small amount of movement permitted to the rider, the modified form is not adapted to be used for depth gage purposes.

Referring now to the preferred form, a wall of the rider 2 is preferably shaped to conform with the convex face 1a of the tape and rearward marginal edge 2a of said wall is beveled and relieve in V-shape to prevent it catching on the work and thus producing an erroneous measurement instead of allowing the serrated face 3a of the hook to take properly against the work.

The margins 2b of the rider are bent around the longitudinal edges of the tape and constitute ways that guide the rider and keep the face of the hook perpendicular to the length of the tape. One or more abutments or stops, such as rivet heads 4, are fixed to the tape near its end to prevent rider 2 from coming off. In each of the forms herein shown and described, sliding movement of the hook toward the end of the tape is stopped by such an abutment member on the tape. The abutment is so placed on the tape in relation to the hook that the inner work-engaging face, 3a, of the hook will register precisely with the zero point of the tape, as shown in Fig. 1. The opposite, or outer, face of the hook 3, (being the left-hand face in Fig. 1), will project beyond the zero point of the tape precisely a distance equal to the thickness of the blade of the hook.

In the form shown in Figs. 9 to 11, the hook can be slid back only a distance equal to the thickness of the hook 3 and, therefore, the movement of the hook is of such a restricted character that it precisely accommodates for the thickness of the hook member 3.

In Figs. 4, 7, 8 the arrangement is such that the hook can be slid along the tape for any desired distance away from its free end, enabling the device to be used also for depth measurements in the manner shown.

Marginal apertures 2c are provided in the rider 2, one at each side of hook 3 as shown in Fig. 4. The end wall 2d of each aperture constitutes the abutment referred to.

A typical use of the invention in its preferred form, measuring the depth of an automobile window pocket, is shown in Fig. 7, where the tape is slid into the pocket to its bottom, and hook 2 serves as a slidable depth gage.

In Fig. 8, the distance X is gaged in similar manner, although the operator may not be able to reach his hand into the pipe, and must, therefore, take the measurement from a station at an end of the pipe remote from the place, X, being measured.

The hook can be slid easily along the tape toward and away from its end, there being sufficient frictional resistance between the hook and tape to allow the hook to serve as a slidable gage to indicate the correct reading at any adjusted position along the length of the tape.

Referring now to a modified form of the device wherein the slider is permitted a small amount of movement, as shown in Figs. 9, 10, 11. At the end of the tape is secured a strap of metal 5, shaped so as to provide a slot to receive the slider 6, having hook 7 at one end and wings 6a at its other end. The end 5a of the strap 5 constitutes the true zero of the graduated scale. The end of tape 1 proper is fore-shortened as shown in Fig. 9 to give a clearance 8, at least equal to the thickness of hook 7, so that when taking abutment measurements the hook will push back and its thickness will not in any way affect the accuracy of the measurement, as is evident from inspection of Fig. 11.

Having thus described my invention, what I claim and desire to secure by Letters Patent is:

1. In combination with a concavo-convex tape measure, a hook member thereon adapted for sliding movement lengthwise thereof, an abutment member on the tape measure positioned to halt movement of the hook toward the end of the tape when the inner working face thereof is in register with zero position of the tape graduations.

2. In combination with a concavo-convex tape measure, a rider thereon including a hook and ways adapted for sliding movement lengthwise the tape measure, an abutment on the tape measure positioned so as to halt movement of the rider toward the end of the tape when the inner working face of the hook is in register with zero position of the tape graduations.

3. A structure as claimed in claim 2 wherein the rider is shaped to conform with the convex face of the tape and its rearward marginal edge is formed with a substantially V-shaped relief notch whereby catching on the work is avoided.

4. In combination with a concavo-convex tape measure, a hook carrying member, a hook on said member, said member being mounted for sliding movement lengthwise thereof, an abutment member on the tape measure positioned near the end thereof so as to halt movement of the hook carrying member toward the end of the tape when the inner working face of the hook is in register with the zero position of the tape graduations.

5. In combination with a metallic tape measure, a hook member thereon adapted for sliding movement lengthwise thereof, an abutment member on the tape measure positioned to halt movement of the hook toward the end of the tape when the inner working face thereof is in register with the zero position of the tape graduations.

6. In combination with a measuring ruler having an indexed surface, a tip mounted on an end thereof for free sliding movement longitudinally thereof, said tip having a body portion substantially paralleling the indexed surface and a portion extending substantially at right angles to the body portion, and means to limit the free movement of the tip to a distance substantially equal to the thickness of said portion extending at right angles to said body portion.

7. In combination with a ruler having an index near one end, an automatic measuring tip, said tip having an ear extending perpendicularly to said tip, said tip and ruler having means associated therewith for fastening said tip to said ruler, and allowing free limited longitudinal movement between said tip and said ruler, said movement being limited in length to the thickness of the material forming said ear.

FRED BUCK.